C. B. DEEDS.
TIRE RIM.
APPLICATION FILED JUNE 19, 1918.
1,322,095.
Patented Nov. 18, 1919.
2 SHEETS—SHEET 1
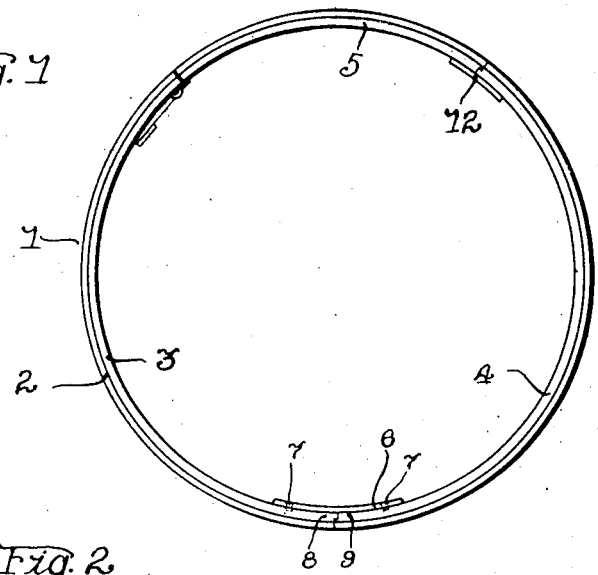
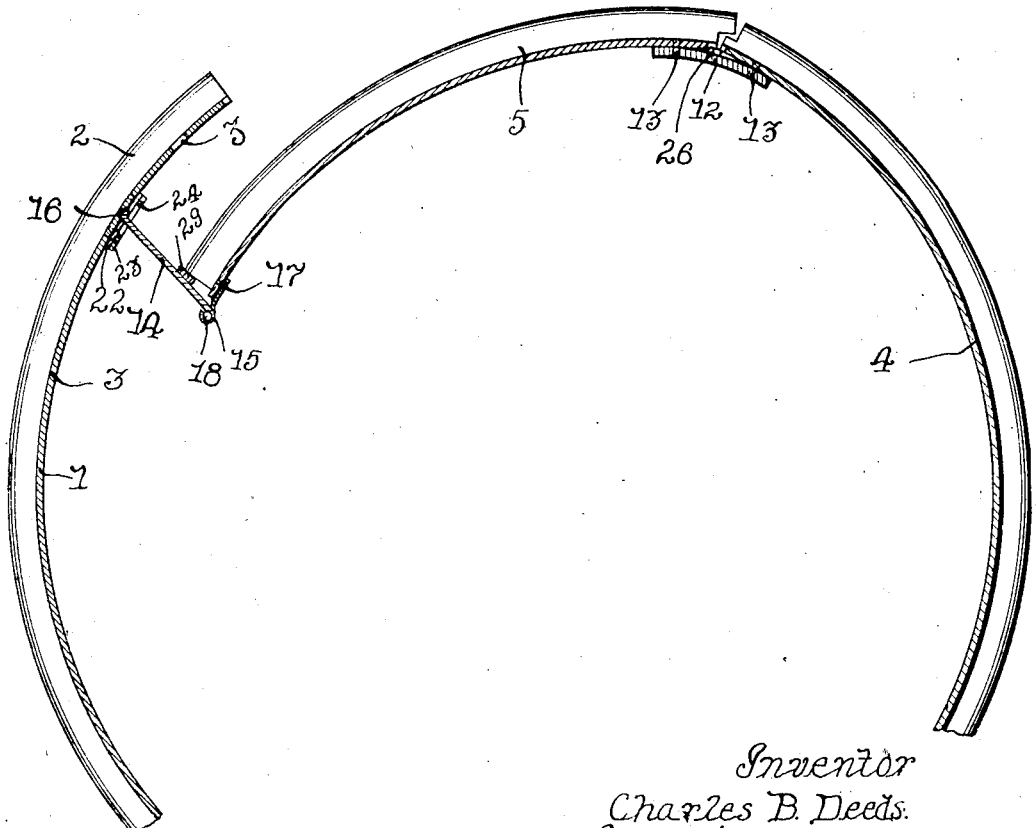
Inventor
Charles B. Deeds.
By Brown Hanson Boutcher
Attorneys.

C. B. DEEDS.
TIRE RIM.
APPLICATION FILED JUNE 19, 1918.
1,322,095.
Patented Nov. 18, 1919.
2 SHEETS—SHEET 2.
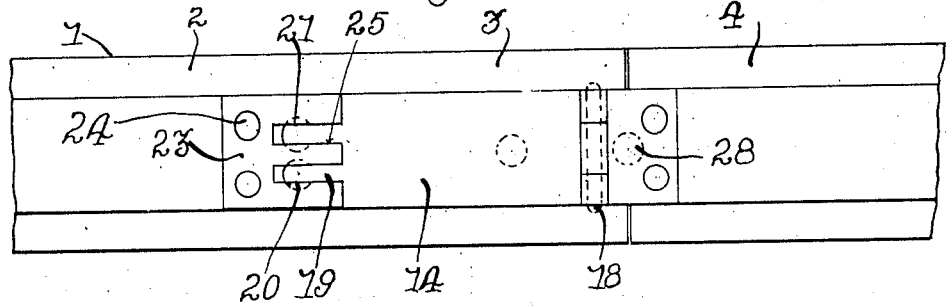
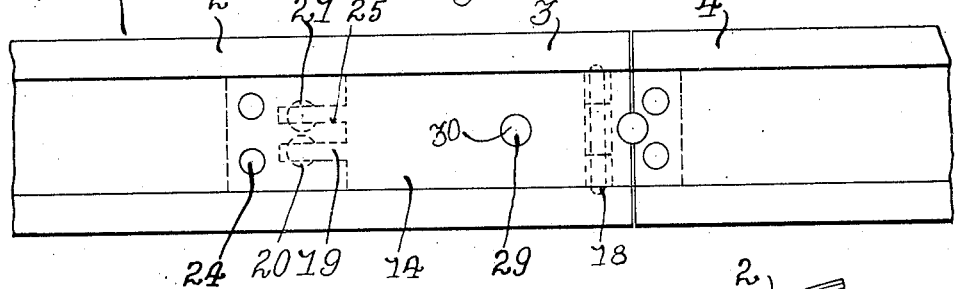
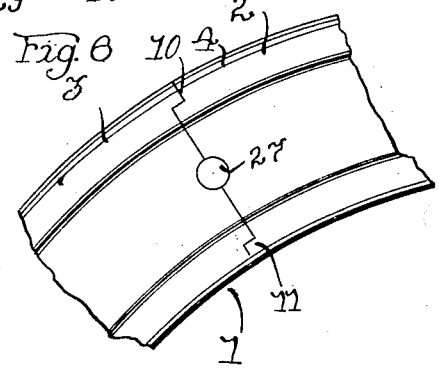
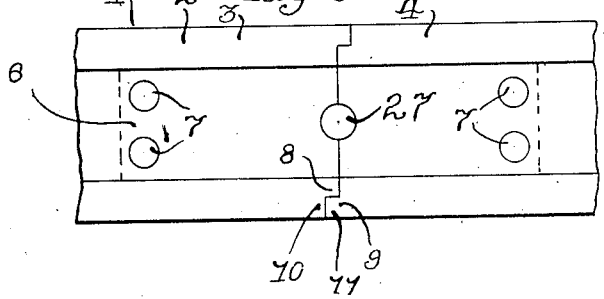
Inventor
Charles B. Deeds.
By Brown, Hanson & Boutch
Attorneys

UNITED STATES PATENT OFFICE.

CHARLES B. DEEDS, OF SAVANNA, ILLINOIS, ASSIGNOR, BY MESNE ASSIGNMENTS, TO LIGHTNING CHANGE RIM CORPORATION, OF BERRIEN SPRINGS, MICHIGAN, A CORPORATION OF MICHIGAN.

TIRE-RIM.

1,322,095.  Specification of Letters Patent.  Patented Nov. 18, 1919.

Application filed June 19, 1918. Serial No. 240,751.

*To all whom it may concern:*

Be it known that I, CHARLES B. DEEDS, a citizen of the United States, residing at Savanna, in the county of Carroll and State of Illinois, have invented a certain new and useful Improvement in Tire-Rims, of which the following is a specification.

My invention relates to tire holding rims and has special reference to collapsible, flanged, metal rims for use with pneumatic or other like tires.

The object of my invention is to provide a flanged rim which can readily and easily be, in effect, contracted in circumference and diameter, so that it can be entered into and taken from a tire casing or tire which is adapted to be mounted thereon. As now constructed, it is well known that many pneumatic tires and solid tires have bases or base beads which are substantially inextensible. The rims which carry such tires are provided with base engaging flanges, and it is therefore necessary to split the rim at one or more points in order to be able to enter the rim into the tire or to remove it therefrom.

My invention consists in a tire rim cut into two or more sections, one of which sections is relatively short and which is easily removable from a position between the ends of the other part of the rim where it braces the ends of the other part apart and forms a true circular rim of the proper dimensions, to a position within the circle of the rim where it permits the ends of the other part to approach each other and thus lessen the curvature of the rim sufficiently so that the flanges of the rim are withdrawn inwardly to permit the rim to pass readily through the tire into and out of tire receiving position.

My invention also consists in the several features of construction and in the arrangements and combinations of parts by which I am enabled to attain the above mentioned and other objects, and all as hereinafter described and particularly pointed out in the appended claims.

My invention will be more readily understood by reference to the accompanying drawings forming part of this specification, and in which—

Figure 1 is a side elevation of a rim constructed in accordance with my invention and shown in extended or tire holding condition;

Fig. 2 is a fragmentary sectional view showing a rim in collapsed or tire removable condition;

Fig. 3 is a fragmentary inner plan view of a portion of the rim showing the toggle link;

Fig. 4 is a fragmentary outer plan view of the linked ends of the rim;

Fig. 5 is a similar plan view of the spring joint of the rim; and

Fig. 6 is a fragmentary perspective plan view of one of the radially interlocking rim joints.

In said drawings, 1 is a rim having circumferential flanges 2 for receiving the base or base beads of the tire. The rim is channel shaped in cross section, it may be of the clencher or straight flange type.

In order to collapse the rim I cut it into three parts or sections 3, 4 and 5. Preferably the sections 3 and 4 are of equal length, and together make up about three quarters of the circumference of the rim. The section 5 is shorter than the others, making up about one quarter of the circumference of the rim.

These three sections or parts when arranged as shown in Fig. 1, that is, in end to end relation, form a rim of the proper circumference and diameter to hold a tire of coöperating dimensions.

I preferably connect the sections 3 and 4 together at their adjacent ends by a strap 6 of spring metal, such as steel, riveting the ends of the strap to the web of the rim by the rivets 7, preferably two at each end. The two rivets at each end are arranged transversely so as best to hold the sections in alinement. In order to take the radial strain off of the strap 6, I cut or form the ends of the sections with radially contacting shoulders 8 and 9 respectively. In other words, I cut the flanges 2 at the joint on zigzag lines as shown to provide a recess 10 on one end and a coöperating tongue 11 on the other end, making the tongues on the opposite sides of the rim extend in opposite directions so as best to dowel or interlock the ends against relative radial movement.

Between the section 4 and the section 5 I provide a hinged joint of limited movement. That is, I provide a joint which permits the section 5 to swing inwardly to some extent to permit it to take the position shown in Fig. 2. The hinge joint consists of a rigid plate 12 loosely jointed to the adjacent ends of the sections 4 and 5 by spherically headed rivets 13. The outer surface of the plate 12 is formed on a curvature of smaller radius than the inner surface of the rim against which it contacts and the rivets 13 are long enough to permit the ends of the plate to separate from the rim when the rim is in expanded position and to permit the relative radial movement of the ends of the plate and rim as the section 5 swings into its inner or collapsed position.

I preferably form this cut in the rim also with the double interlocking tongues, similar to the joint between the sections 3 and 4.

For the purpose of joining the adjacent ends of the sections 3 and 5 to permit the collapsing movement of the section 5, I provide a toggle link 14 formed of strap metal and I permanently hinge the ends of this link to the adjacent ends of the sections 3 and 5.

Preferably I arrange the hinge joint 15 between the link and the section 5 beyond the end of the section 5 to permit the relative movement of the section 5 desired, and I arrange the hinge connection 16 between the link 14 and the section 3 at a suitable distance back from the end of the section 3 so that the rim will be expanded by the link to proper tire holding condition with the adjacent ends of the sections 3 and 5 in proper contact with each other.

I form one end of the plate 14 into a part of the hinge 15, and I form the co-operating part of the hinge on the projecting end of a connection plate 17 which I rivet to the section 5, and the two parts of the hinge are pivotally joined by the hinge pin 18.

To provide the hinge joint 16, I preferably form two parallel projections 19 on the end of the link 14, each provided with a ball-like formation 20 on its end, and I provide sockets 21 to receive the balls 20 in a plate 22. I hold the balls in the sockets 21 by means of a second plate 23 which overlies the plate 22, the two plates being secured together and upon the rim by the rivets 24.

The plate 22 is slotted to receive the projections 19, and the plate 23 is provided with slots 25 to permit the link 14 to swing out when the rim is collapsed. The sockets for the balls 20 may be partly formed in the web of the rim.

In operating my improved rim, it is merely necessary, as a preliminary, to force the linked end of the section 5 inwardly from the position shown in Fig. 1 to the position shown in Fig. 2. This permits the free ends of the sections 3 and 4 to approach each other and thus shorten the rim as a whole.

If this does not suffice to permit the easy removal of the rim from the tire, it is obvious that by applying pressure outwardly upon the linked end of the section 5, the link will swing farther upon the pin 18 and the rim will be forcibly made smaller, the sections 3 and 4 moving toward each other upon the spring plate 6 as upon a hinge.

Having collapsed the rim it can be readily entered into a tire and then readily expanded to tire engaging and holding condition by reversing the action described. The section 5 swings easily back to its position until the rim is nearly expanded to its limit, at which time a very little outward pressure applied to the linked end of the section 5 forces it to its position, the link 14 acting as a toggle to forcibly expand the rim at this time with great pressure.

To prevent the lateral displacement of the adjacent ends of the sections 4 and 5 I provide a dowel pin 26 on the plate 12 and I provide the adjacent ends of the rim sections with registering openings to receive the dowel. I also provide a similar dowel 27 on the spring plate 6 to prevent relative lateral movement of the ends of the rim at this point.

I also provide a dowel 28 on the plate 17 to retain the adjacent ends of the sections 3 and 5 properly registered. As a further means of rigidly holding the adjacent ends of the sections 3 and 5 registered, I provide a dowel 29 on the toggle link 14 adapted to enter a hole 30 in the web of the rim. This last dowel relieves the hinge joint 16 of most of the strain when the rim is in tire carrying condition.

In Fig. 6 I have shown the joint between the sections 3 and 5 of the interlocking form, that is, provided with tongues 11 and recesses 10 as hereinbefore described.

As various structures embodying my invention will readily suggest themselves to one skilled in the art, I do not confine or limit my invention to the specific structures herein shown and described.

I claim:

1. In a rim of the kind described a transverse cut in the rim and a plate within the rim for connecting the two ends thereof, said cut extending transversely through the web of the rim and radially part way through the two flanges, then extending circumferentially of the rim in the flanges in opposite direction in the two flanges a relatively short distance and then extending radially through the outer edges of the two flanges.

2. In a rim of the kind described cut apart at one point in its circumference, the ends of the rim at the cut being formed with circumferentially oppositely extending tongues and coöperating recesses at outer edges of the flanges of the rim, whereby the ends of the rim are interlocked radially in both directions, and a plate within the rim joining the two ends together.

3. A collapsible rim of the kind described, divided transversely at one point in its circumference by a cut extending transversely through the web of the rim and radially part way through the two flanges thereof, then extending circumferentially in one flange in one direction and circumferentially in the other flange in the other direction, and then extending radially through the outer part of the two flanges from the ends of the circumferential portions thereby forming oppositely extending tongues and coöperating recesses at the outer edges of the flanges of the rim, and a plate within the rim joining the two ends thus formed.

4. In a tire rim of the kind described, a rim divided into two sections, one longer than the other, a limited movement hinge joining two adjacent ends and a link joining the other adjacent ends, said link pivotally connected to the short section at a point adjacent, but beyond the end of the short section, and pivotally connected at its other end to the longer section whereby as the shorter section is swung within the longer section on said limited movement hinge, the limited movement hinge will permit the free inward movement of the shorter section a limited amount, after which the shorter section and the link act as a toggle lever adapted to forcibly flex inwardly the longer section through said limited movement hinge.

5. In a rim of the character described, divided into two sections, one shorter than half a circle, the shorter section connected at one end to the adjacent end of the longer section by a bridge plate within the rim, and loosely fitting connectors joining the plate and the ends of the rim and permitting the shorter section to swing inwardly a limited distance, the adjacent ends of the sections at the hinged joint having radially interlocking projections and recesses.

6. In a tire rim of the character described, said rim divided transversely at two points into sections, means linking the sections together at one point and adapted to allow the rim to collapse, a rigid bridge plate within the rim at the other cut and having its rim contacting surface formed on a less curvature than the inner face of the rim, and connected to the rim by loose connectors permitting limited hinging movement of the connected bridged ends of the rim.

7. In a collapsible tire rim of the kind described, the rim cut apart at one point in its circumference, the cut being zig-zagged in the two flanges of the rim and extending in opposite direction in said two flanges, thereby radially interlocking the two ends of the rim in both directions, a plate within the rim spanning said cut and permanently joining the ends of the rim, said plate permitting a limited hinging movement only of the connected parts of the rim.

8. In a collapsible rim of the kind described, cut at a number of points, plates within the rim and joining the ends of the rim, the cuts having portions extending circumferentially in opposite directions in the two flanges of the rim and forming radially contacting shoulders, thereby radially interlocking the two adjacent ends of the rim radially in both directions.

9. In a collapsible rim of the kind described, cut apart at a number of points, bridge plates within the rim and joining the ends of the parts, said cuts having portions extending in the flanges of the rim forming radially engaging shoulders, the ends of the rim provided with registering notches in the web portion, and a dowel pin on the bridge plate entering such notches and preventing relative lateral movement of the connected ends of the rim.

10. In a collapsible rim of the kind described, said rim cut apart at least at two points in its circumference a rigid plate within the rim spanning the cut at one point, loose connectors joining the ends of the plate to the rim, the outer surface of the plate cut away toward its ends to permit a limited hinging movement only of the ends of the rim at said cuts.

In witness whereof I hereunto subscribe my name this 15th day of June, A. D., 1918.

CHARLES B. DEEDS.